Patented July 9, 1946

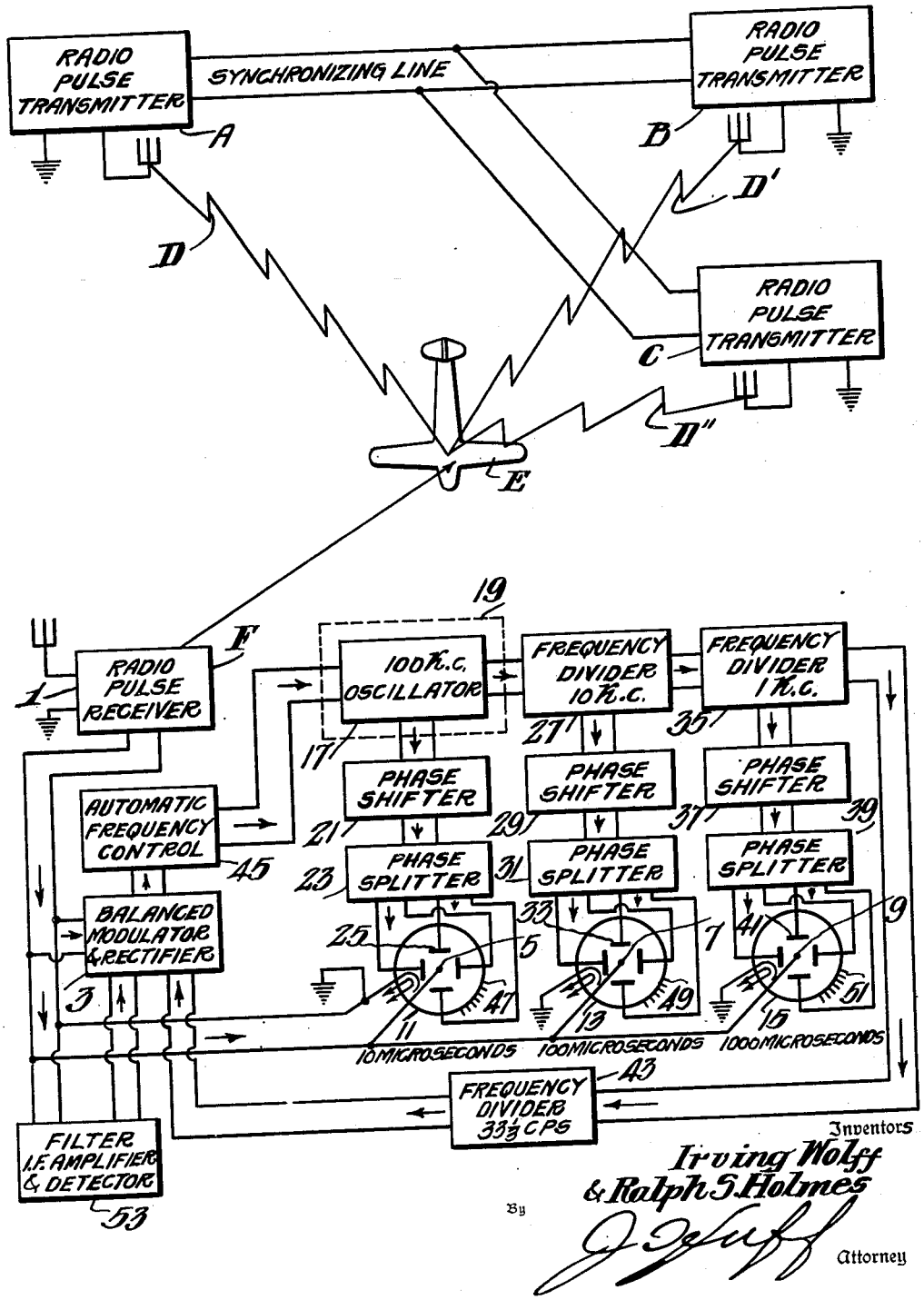

2,403,626

UNITED STATES PATENT OFFICE 2,403,626

RADIO PULSE POSITION INDICATING SYSTEM

Irving Wolff and Ralph S. Holmes, Haddonfield, N. J., assignors to Radio Corporation of America, a corporation of Delaware Application November 29, 1941, Serial No. 420,944

10 Claims. (Cl. 250—1)

This invention relates to improvements in radio pulse position indicating systems and particularly to a radio pulse position indicating system in which pulse signals radiated from a plurality of synchronized pulse transmitters are received and timed with respect to each other so that the differences in pulse propagation times indicate the position of the receiver.

A system for indicating position by measuring the propagation times of pulses radiated from an aircraft receiver (located at an unknown point) and relayed from two fixedly positioned relay transmitters back to a receiver on the aircraft, has been described in an allowed application Serial No. 329,434, filed April 13, 1940, by Stuart Seeley. An improvement of the Seeley device is described in copending application Serial No. 384,323, filed March 20, 1941, by Irving Wolff for improvements in Position finders. The Wolff improvement describes a decade type of cathode ray timer.

In the Seeley device, a moving vehicle, such as a plane, is equipped with a pulse transmitter and receiving apparatus including a cathode ray indicator. Pulses transmitted from the plane are received at two ground stations at known locations. Each ground station comprises a radio relay which re-radiates the pulses at a slightly different frequency. The re-radiated pulses are received on the plane and compared on the cathode ray indicator to provide indications of the distance and position of the plane with respect to the known locations of the ground relay stations.

The Wolff device describes a system similar to that of the Seeley device with the addition of a decade vernier type of cathode ray indicator for providing accurate indications of the distances of the relay stations from the plane. The vernier scales are produced by utilizing a plurality of cathode ray indicators in which the respective cathode ray beams are rotated at relative speeds of 1:10:100.

While the Seeley device and the Wolff improvement thereof are accurate and practical, there may be two objections: First, in time of war the signals from aircraft transmitters may be received by the enemy who will be able to locate the signal source by conventional radiogoniometric methods and thereafter destroy the aircraft before it can reach its objective; and second, the described system is designed to position a single aircraft or other vehicle and it is not apparent how a large number of vehicles on different courses could use the same relays without confusion.

One of the objects of the present invention is to provide improved means for indicating position as a function of the differences in times of reception of a plurality of pulses radiated simultaneously or in predetermined time relation from a plurality of radio pulse transmitters located at predetermined points. Another object is to provide an improved position indicating system in which the transmitted signals are pulses of radio frequency energy radiated in synchronism from points of known location. Another object is to provide a decade type of pulse timer in which one group of the incoming pulses to be timed is used to synchronize the timer.

The invention will be described by referring to the accompanying drawing in which the schematic diagram represents one embodiment of the invention.

Referring to the figure of the drawing, radio pulse transmitters are located at known positions A, B and C. The transmitters are preferably connected by a synchronizing line, although any means may be used to control the radiation of pulses D, D' and D" in predetermined time relation. The pulses are sharply defined, and are radiated at high and, if desired, different, carrier frequencies and at relatively low pulse frequencies for long range operation. By way of example, the carrier frequency may be 500 megacycles and 33⅓ pulses per second may be radiated. These pulses are received on an aircraft E at the same time if the aircraft receiver, indicated generally as F is equally distant from the three transmitters. If the receiver F is equally distant from A and B but at some other distance from C, the pulses D and D' will reach E at the same time, while the pulse D" will reach E at an earlier or later time dependent upon whether the distance from E to C is less than or more than the distance from E to A or from E to B. While several pulses have been shown between the transmitter and receiver, it should be understood that the pulse rate is designed for the maximum range and for the prevention of pulse repetition within the range, which would be confusing. Actually only a single pulse would appear between any of the transmitters and the receiver at any instant, if the receiver is within the maximum range for which the system is designed.

The transmitters are preferably not symmetrically located in the same straight line, because such location would result in 180° ambiguity which may be avoided by the less regular spacing shown. It should be understood that the system may be designed to indicate the position of an aircraft with respect to an object on the earth and that a suitable correction should be made for distance and altitude, if extreme accuracy is required. In the event that the distance is great, with respect to the altitude, the error will be very small. It is desirable to calculate in advance the differences in pulse propagation times which will exist at any predetermined location so that the aircraft operator may simply fly a course which tends to bring the several differences in pulse propagation times to the predetermined values.

For example, if the distances AE=300 kilometers; BE=310 kilometers; and CE=295 kilometers, the several propagation times in microseconds will equal the velocity of light (which is 300,000 kilometers per second) divided into the distance. Thus the pulse propagation time from A to E will equal .001 second or 1000 microseconds, B to E pulse propagation time will equal 1033.3 microseconds; and C to E pulse propagation time will equal 983.3 microseconds. Therefore, the differences in pulse propagation times will be as follows: BE minus AE will be 33.3 microseconds; BE minus CE will be 50 microseconds; and AE minus CE will be 16.7 microseconds. With the irregular positioning of the transmitters there is only one map position which will correspond to these differences in time. An aircraft pilot can fly the aircraft until these time differences are indicated on the aircraft pulse receiver and then the aircraft will be at the specified or predetermined position.

One suitable aircraft receiver is indicated in the figure of the drawing. A radio pulse receiver 1 is connected to a balanced modulator and rectifier 3 which may be of the type described in U. S. Patent 2,234,587 having any conventional rectifier connected in its output circuit, and to the radial deflecting electrodes 5, 7, 9 of three cathode ray indicators 11, 13, 15. The function of the balanced modulator will be described later. The cathode ray indicators form decade timing indicators which are connected as follows: A stabilized oscillator 17, preferably arranged within a temperature controlled compartment 19, is connected through a phase shifter 21 to a phase splitter 23. The two phase output of the phase splitter is applied to the deflecting elements 25 of the first cathode ray tube 11 to produce a rotating field. The current from the stabilized oscillator 17 is next applied to a frequency divider 27 to lower the frequency tenfold. The currents of reduced frequency are applied through a second phase shifter 29 and a second phase splitter 31 to the deflecting elements 33 of the second cathode ray tube 13 to produce a rotating field of one tenth the angular velocity of the field in the first tube. The output of the first frequency divider 27 is also applied to a second frequency divider 35 which again divides the frequency by ten. The output of the second frequency divider 35 is applied through a third phase shifter 37 and a third phase splitter 39 to the deflecting elements 41 of the third cathode ray tube 15 to produce a rotating field having an angular velocity equal to one tenth of the angular velocity of the field in the second tube.

The output of the second frequency divider 35 is applied to a third frequency divider 43, which reduces the frequency to the pulse rate. The output of the third frequency divider 43 is applied to the balanced modulator and rectifier 3. The output of the balanced modulator and rectifier is applied to an automatic frequency control device 45. The output of the frequency control device 45 is applied to the first oscillator to synchronize the local oscillation with the incoming pulses.

The mode of operation is as follows: The local oscillator may be operated at 100 kilocycles per second. The currents from the local oscillator 17 are applied through the phase shifter 21 which permits the first received pulse to be phased to correspond to the zero of the cathode ray tube scale 47. The suitably phased currents are split into currents of quadrature phase and are applied to the deflecting elements 25 to produce a rotating field. The rotating field causes the cathode ray to rotate at 100,000 revolutions per second. The oscillator currents of a frequency of 100 kc. are divided to establish currents of a frequency of 10 kc. The currents of 10 kc. are phased by the second phase shifter 29 so that the zero of the second cathode ray tube scale 49 may be made to correspond with the first received pulse. The currents of 10 kc. are split into two phase currents, which are applied to the deflecting elements 33 of the second cathode ray tube to produce a rotating field. This field rotates the ray of the second cathode ray tube 10,000 times per second. The local currents are further divided in frequency and, after phasing and phase splitting, are applied to rotate the ray of the third cathode ray tube 15 at the rate of 1000 revolutions per second.

The incoming pulses are applied to the several radial deflecting electrodes 5, 7 and 9 to deflect radially the rotating cathode rays. Since the rays are rotating relatively slowly in the third tube 15 only large differences in the times of arrival of the pulses from the three transmitters will be indicated. For example, a complete rotation of the ray corresponds to 1000 microseconds. The second tube 13 has a ray which rotates ten times as fast so that one complete rotation will correspond to 100 microseconds. The first tube, with its ray rotating one hundred times faster than the ray of the third tube, will have a scale in which one complete rotation corresponds to 10 microseconds. Since the scale 47 may be divided into 100 parts, it follows that a time difference of .1 microsecond may be indicated without difficulty. The pulses travel 300 meters in one microsecond, therefore 30 meters in .1 microsecond, so that distances may be readily determined to within 30 meters or better.

In order that the local oscillator 17 may be synchronized with the incoming pulses, the local currents are frequency divided until a current of the pulse frequency is derived. For example, 33⅓ cycles per second, which corresponds to a maximum range of nearly 10,000 kilometers, has been chosen as the pulse frequency. The incoming pulses are detected and are applied at the pulse rate of 33⅓ C. P. S. to the balanced modulator 3, to which the alternating current obtained by frequency division at the rate of 33⅓ C. P. S. are also applied. As long as the two currents are of identical phase or frequency, no output is obtained from the balanced modulator. If the frequency or phase of the local oscillator varies, a current will appear in the output of the balanced modulator. The output current, if not already rectified in the balanced modulator, may be rectified and applied through an automatic frequency control tube to increase or decrease the frequency of the local oscillator 17. The local oscillator is thus locked-in with the transmitter pulse frequency. The locking-in may be affected by the pulses arriving at different times from the several transmitters. In this event the carrier of one of the transmitters is made slightly different. The pulse receiver, which is preferably a superheterodyne, is made with an intermediate frequency amplifier responsive to both carriers, which are then separated by filtering the currents of the carrier to be applied to the balanced modulator. Thus filtered only the pulses of the selected carrier are used to lock-in the local oscillator. It should be understood that the filter 53 may include tuned intermediate frequency amplifier stages and a detector.

In the system described no means are provided for distinguishing the pulses from the several transmitters. It is not essential that the pulses be distinguished because the aircraft carrying the receiver may be flown along a course and, by observing whether the pulses are approaching each other or receding from each other, the operator may determine if the course is bringing the craft toward or away from the several transmitters. If more precise information is desired, a radio goniometer may be used to indicate the bearing of any one of the transmitters, if their carriers are distinguishable. It should be understood that three separate receivers may be used to receive three different carriers thereby making continuous identification practical. In place of three separate receivers a single receiver may be successively tuned to the several carriers. Another method of distinguishing the transmitted pulses is described in the copending applications hereinafter cited.

Inasmuch as the slowest ray rotates ten times for each pulse and the fastest a thousand times for each pulse, it will be difficult to observe the pulses if the rotating ray is continuously applied to the fluorescent screen of the cathode ray tubes. One method of avoiding the difficulty is to mask the rotating ray at all times except during the radial deflection. The masking may be effected by optical or electrical means. If electrical means are used, the ray is biased off for all but one or two rotations which include the received pulse. Suitable means for blanking manually or automatically are disclosed in copending applications Serial No. 420,919, filed November 29, 1941, by John P. Smith, and Serial No. 420,928, filed November 29, 1941, by Ralph S. Holmes and John P. Smith.

We claim as our invention:

1. A radio pulse position indicating system including means for radiating synchronously discrete pulses of radio energy from a plurality of predetermined locations, remotely located receiving means including means for receiving said pulses, a source of local oscillations, a timing indicator, means connecting said source to said indicator for applying said oscillations to drive said indicator at a substantially constant rate, means connecting said receiver and local source for synchronizing said local oscillations and said pulses, and means for applying said received pulses to said indicator to indicate the differences in times of said pulse reception thereby to indicate the distance of said receiver from each of said predetermined locations.

2. A radio pulse position indicating system including means for radiating predetermined relatively timed discrete pulses of radio energy from a plurality of predetermined locations, remotely located receiving means including means for receiving said pulses, a source of local oscillations, a timing indicator, means connecting said source to said indicator for applying said oscillations to drive said indicator at a substantially constant angular rate, means connecting said receiver and local source for synchronizing said local oscillations and said pulses, and means for applying said received pulses to said indicator to indicate the differences in times of said pulse reception thereby to indicate the distance of said receiver from each of said predetermined locations.

3. A radio pulse position indicating system including means for radiating pulses of radio energy from a plurality of predetermined locations, means for synchronizing the radiation of said pulses so that all pulses are radiated in predetermined phase relation, remotely located receiving means including means for receiving said pulses, a main timing indicator, a vernier timing indicator, a source of oscillations, means connecting said source to each of said indicators, for driving said indicators at different substantially constant rates, and means connecting said receiving means to said indicators for applying received pulses to said indicators to denote their relative times of reception whereby the distance of said receiver from each of said locations may be indicated as functions of said relative times.

4. A radio pulse position indicating system including means for radiating pulses of radio energy from a plurality of predetermined locations, means for synchronizing the radiation of said pulses so that all pulses are radiated in a predetermined phase relation, remotely located receiving means including means for receiving said pulses, a timing indicator, a source of oscillations, means connecting said source to said indicator for driving said indicator at a substantially constant rate, means connecting said receiving means to said indicator for applying received pulses to said indicator to denote their relative times of reception whereby the distance of said receiver from each of said locations may be indicated as functions of said relative times, and means connecting said source of oscillations and said receiving means for synchronizing said local oscillations and said pulse transmission.

5. A radio pulse position indicating system including means for radiating distinguishable pulses of radio energy from a plurality of predetermined locations, means for synchronizing the radiation of said pulses so that all pulses are radiated in predetermined time relation, remotely located receiving means including means for receiving said pulses, a timing indicator, a source of oscillations, means connecting said source to said indicator for driving said indicator at a substantially constant rate, means connecting said receiving means to said indicator for applying received pulses to said indicator to denote their relative times of reception whereby the distance of said receiver from each of said locations may be indicated as functions of said relative times, and means connecting said source of oscillations and said receiving means for synchronizing said local oscillations with one of said plurality of distinguishable pulse radiations.

6. A pulse receiver and indicator for a position indicating system including means for receiving said pulses, a plurality of cathode ray tubes, a source of local oscillations of substantially constant frequency, means connecting said source to one of said tubes for appyling said oscillations to rotate its ray at said constant frequency, means for dividing said oscillations of constant frequency into oscillations of a lower frequency, means connecting said frequency dividing means to another of said tubes for applying said oscillations of lower frequency to rotate its ray at said lower frequency, means connecting said pulse receiving means to said tubes for applying said received pulses to produce visual indications on said tubes to indicate differences in the times of reception of said pulses, and means connecting said receiving means and said source for synchronizing said local oscillations with the received pulses.

7. A pulse receiver and indicator for a radio positioning system including a pulse receiver responsive to position indicating pulses, a source of local oscillations of substantially constant frequency, means connecting said receiver to said source for applying the received pulses to control said substantially constant frequency, a plurality of cathode ray tubes, means connecting said source to one of said tubes for applying said oscillations of constant frequency to rotate its ray at said constant frequency, means for dividing said oscillations of constant frequency to produce oscillations of frequencies of one tenth and one hundredth of said constant frequency, means connecting said frequency dividing means to a second of said tubes for applying said oscillations of one tenth frequency to rotate the ray of said second tube, means connecting said frequency dividing means to a third of said tubes for applying said oscillations of one hundredth frequency to rotate the ray of said third tube, and means connecting said receiver to said tubes for applying pulses derived from the output of said receiver to deflect radially the rays of said cathode ray tubes and hence to indicate the relative times of reception of said pulses.

8. A pulse receiver and indicator according to claim 7 including means connecting said receiver and said source for phasing the oscillations applied to rotate the rays of said cathode ray tubes so that said rotating rays may be synchronized with a selected received pulse.

9. A radio pulse position indicating system including means for radiating synchronously discrete pulses of radio energy from a plurality of predetermined locations, remotely located receiving means including means for receiving said pulses, a source of local oscillations, a timing indicator, means connecting said source to said indicator for applying said oscillations to drive said indicator at a substantially constant rate, means connecting said receiver and local source for synchronizing said local oscillations and said pulses, and means for applying said received pulses to said indicator to indicate the differences in times of said pulse reception thereby to indicate the difference in the distances between each of said locations and said remotely located receiving means.

10. A radio pulse position indicating system including means for radiating pulses of radio energy from a plurality of predetermined locations, means for synchronizing the radiation of said pulses so that all pulses are radiated in predetermined phase relation, remotely located receiving means including means for receiving said pulses, a timing indicator, a source of oscillations, means for adjusting the frequency of said oscillations, means connecting said source to said indicator for driving said indicator at a substantially constant rate, and means connecting said receiving means to said indicator for applying received pulses to said indicator to denote the relative times of reception of said pulses whereby the difference in the distances between said locations and said remotely located receiving means may be indicated.

IRVING WOLFF.
RALPH S. HOLMES.